US007979583B2

(12) United States Patent
Okano

(10) Patent No.: US 7,979,583 B2
(45) Date of Patent: Jul. 12, 2011

(54) INFORMATION PROCESSING APPARATUS, CLIENT APPARATUS, INFORMATION PROCESSING SYSTEM AND SERVICE CONNECTION METHOD

(75) Inventor: Hideo Okano, Hanno (JP)

(73) Assignee: Olympus Corporation, Tokyo (JP)

(*) Notice: Subject to any disclaimer, the term of this patent is extended or adjusted under 35 U.S.C. 154(b) by 322 days.

(21) Appl. No.: 12/124,399

(22) Filed: May 21, 2008

(65) Prior Publication Data

US 2008/0294718 A1 Nov. 27, 2008

(30) Foreign Application Priority Data

May 21, 2007 (JP) ................................ 2007-134720

(51) Int. Cl.
*G06F 15/16* (2006.01)

(52) U.S. Cl. ......................... 709/245; 709/225; 379/201

(58) Field of Classification Search .................. 709/245, 709/225
See application file for complete search history.

(56) References Cited

U.S. PATENT DOCUMENTS 7,568,222 B2* 7/2009 Randle et al. ..................... 726/8
7,716,368 B2* 5/2010 Kawano et al. ............... 709/245
2002/0133592 A1* 9/2002 Matsuda et al. .............. 709/225
2003/0086567 A1* 5/2003 Okamoto et al. ............. 380/201
2004/0133678 A1* 7/2004 Tamura ......................... 709/225
2005/0177646 A1* 8/2005 Kawano et al. ............... 709/245
2006/0143286 A1* 6/2006 Aoki et al. .................... 709/220
2007/0143102 A1* 6/2007 Yamada ........................ 704/200
2007/0189486 A1* 8/2007 Ise ........................... 379/201.12
2008/0034099 A1* 2/2008 Kageyama .................... 709/228

FOREIGN PATENT DOCUMENTS

JP 2001-36791 A 2/2001

* cited by examiner

*Primary Examiner* — Wing F Chan
*Assistant Examiner* — Tesfay Yohannes
(74) *Attorney, Agent, or Firm* — Westerman, Hattori, Daniels & Adrian, LLP

(57) ABSTRACT

An information processing apparatus includes a server function configured to provide one or more services to a client apparatus via a communication network. The information processing apparatus includes a service ID generation unit configured to generate service IDs for each of the services and to associate the service IDs with the services for identifying the services, a service ID transmission unit configured to transmit the service ID to at least one of the client apparatus and a discovery proxy server connected to the communication network via the communication network, and a service connection unit configured to connect a service to be specified by the service ID included a service connection inquiry with one of the client apparatus and the discovery proxy server that is an inquiry origin when the service connection inquiry has been made from the one of the client apparatus and the discovery proxy server.

14 Claims, 11 Drawing Sheets

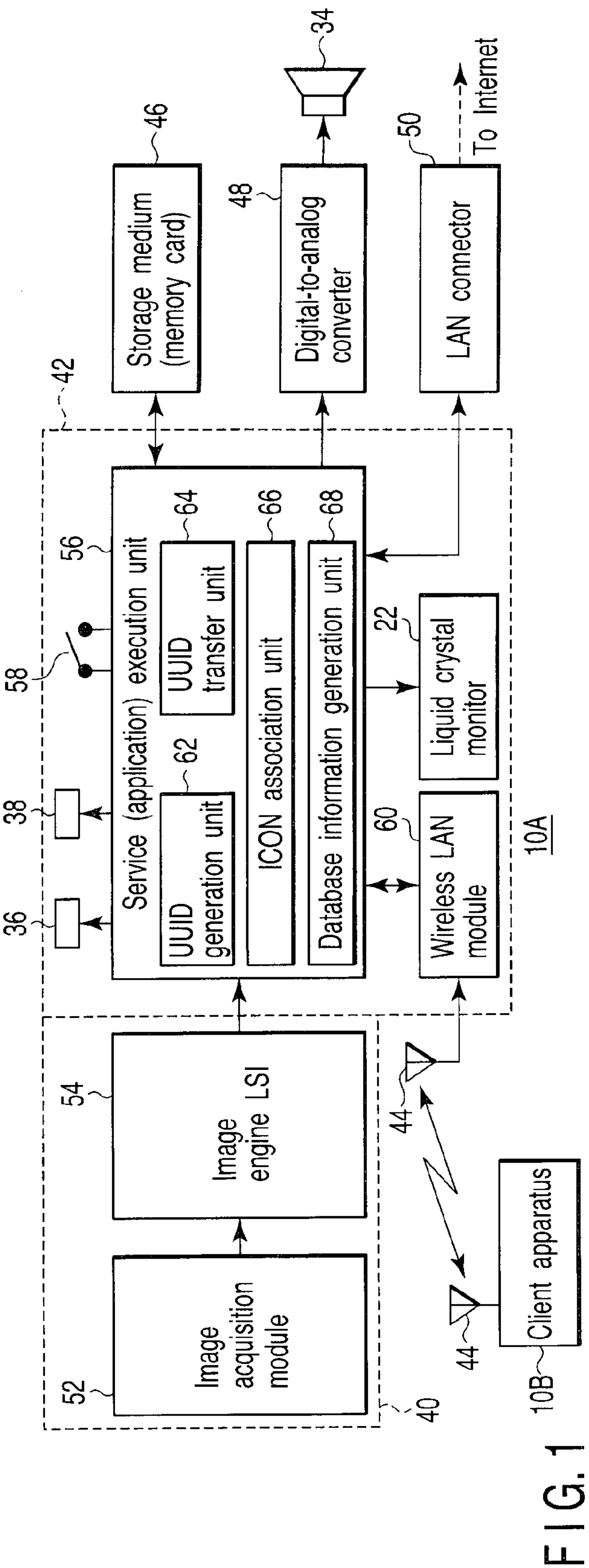
F I G. 1
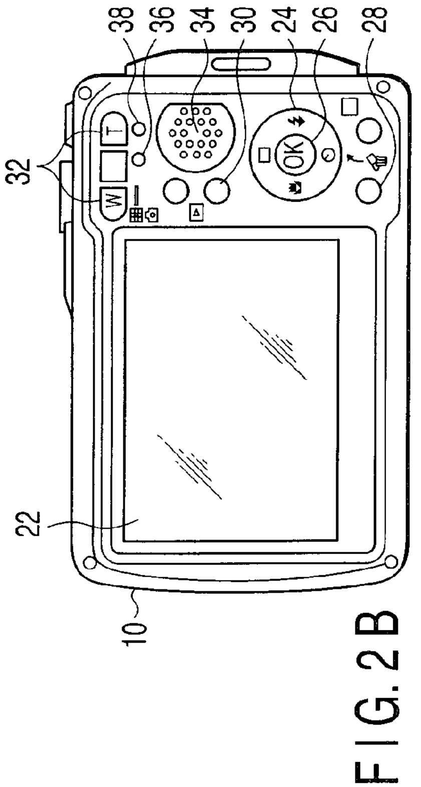
F I G. 2 B
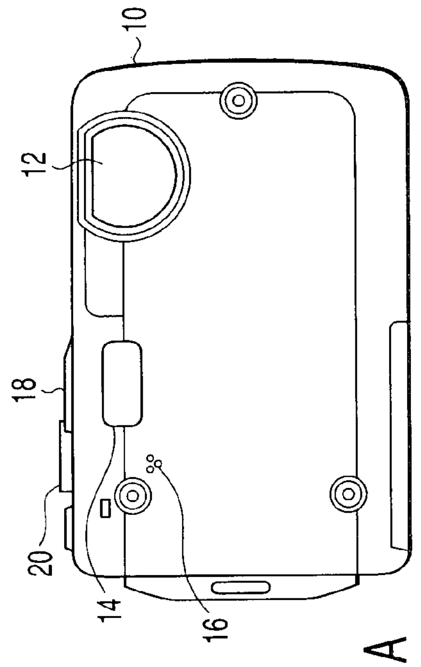
F I G. 2 A

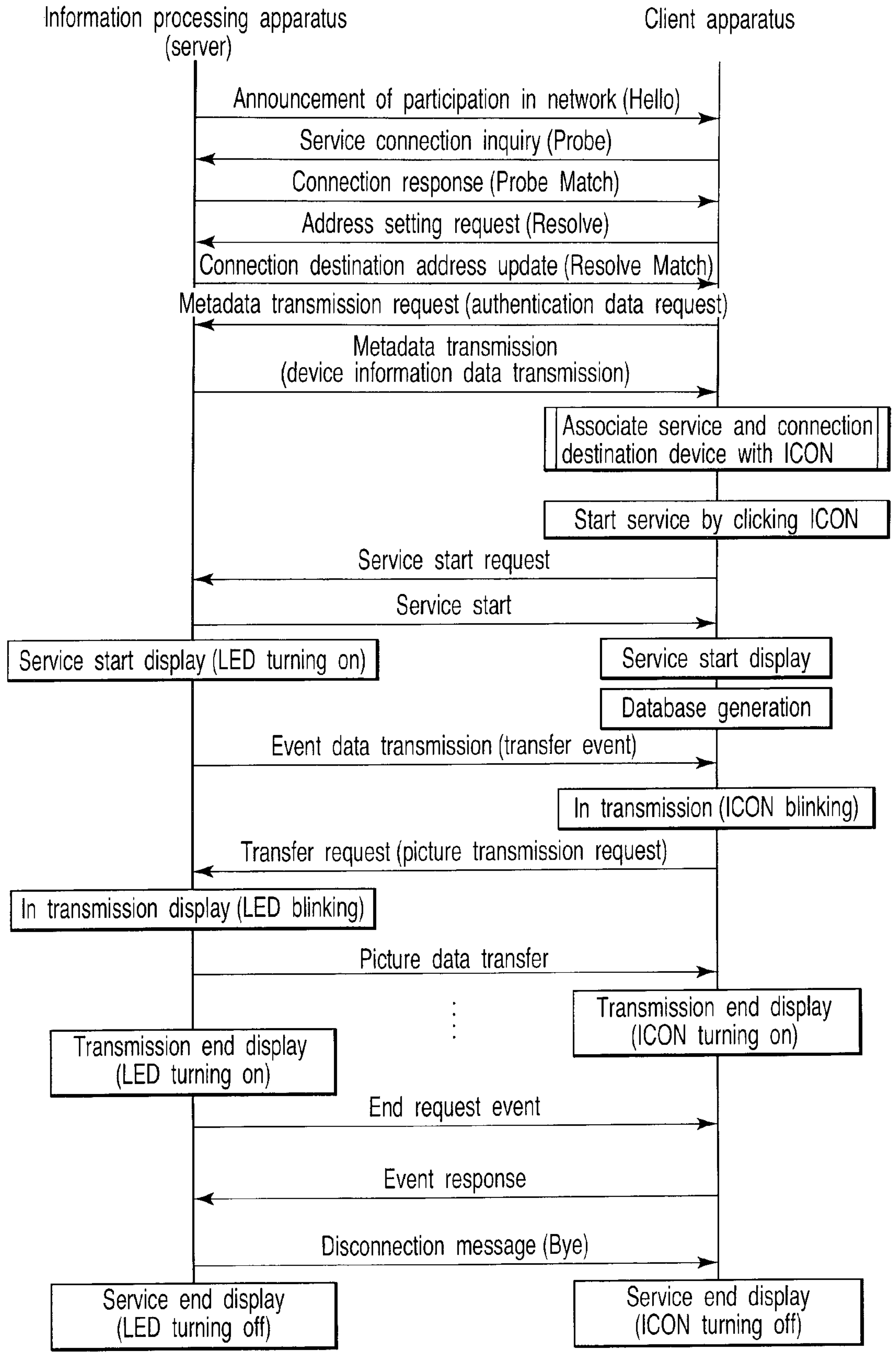
F I G. 5

```
<s:Envelope>
  <s:Header>
   <a:Action>
     http://schemas.xmlsoap.org/ws/2005/04/discovery/Hello
   </a:Action>
       <a:MessageID>
        uuid:XXXXXXXX-XXXX-XXXX-XXXX-XXXXXXXXXXXX   76
   </a:MessageID>
   <a:To>urn:schemas-xmlsoap-org:ws:2005:04:discovery</a:To>
   <d:AppSequence InstanceId="XXXXXXXXXX" MessageNumber="1"/>
   </s:Header>
  <s:Body>
   <d:Hello>
     <a:EndpointReference>
      <a:Address>
        uuid:XXXXXXXX-XXXX-XXXX-XXXX-XXXXXXXXXXXX   76
      </a:Address>
   </a:EndpointReference>
   <d:MetadataVersion>XXXXX</d:MetadataVersion>
   </d:Hello>
  </s:Body>
</s:Envelope>
```

72 (Header), 74 (Body), 70 (Envelope)

F I G. 6

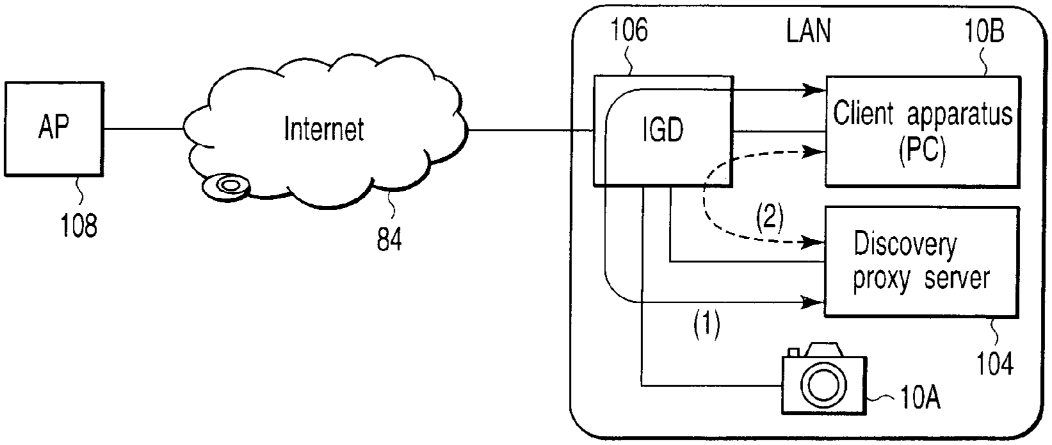
F I G. 1 1
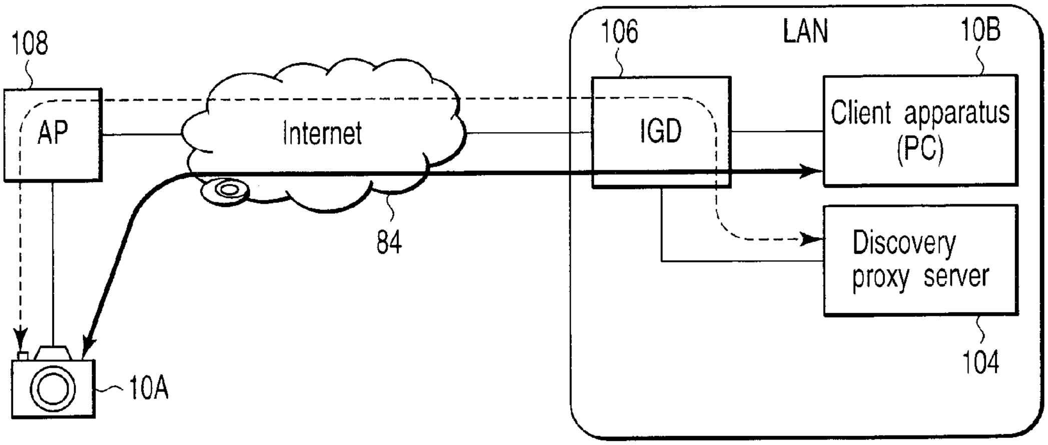
F I G. 1 3

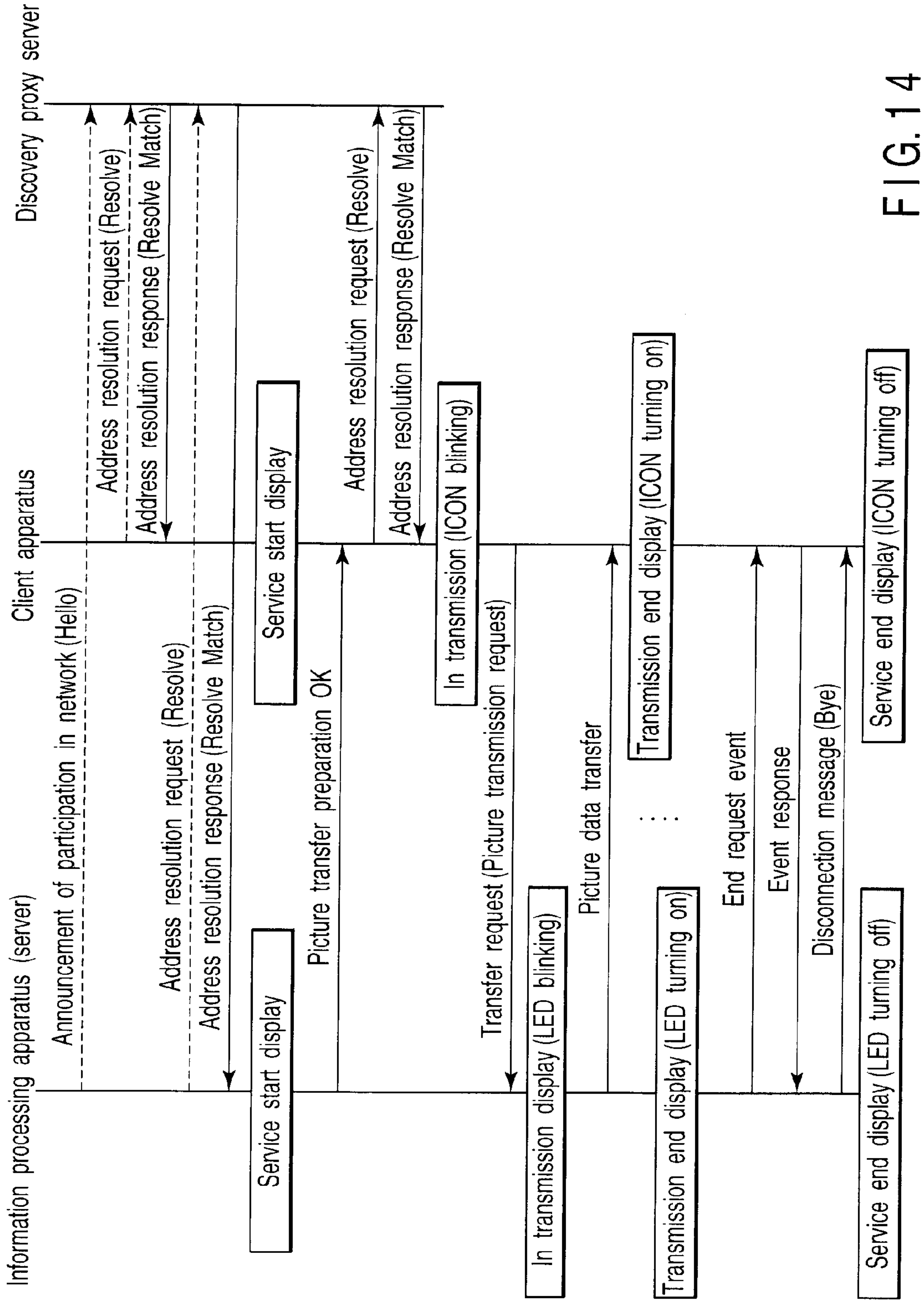
F I G. 1 4

INFORMATION PROCESSING APPARATUS, CLIENT APPARATUS, INFORMATION PROCESSING SYSTEM AND SERVICE CONNECTION METHOD

CROSS-REFERENCE TO RELATED APPLICATIONS

This application is based upon and claims the benefit of priority from prior Japanese Patent Application No. 2007-134720, filed May 21, 2007, the entire contents of which are incorporated herein by reference.

BACKGROUND OF THE INVENTION

1. Field of the Invention

The present invention relates to an information processing apparatus and a client apparatus configured to communicate with each other via a communication network. Further, the invention relates to an information processing system which includes the information processing apparatus, the client apparatus and a discovery proxy server which is mutually communicable with the both apparatuses via the communication network. Further, the invention relates to a service connection method which connects the client apparatus to predetermined services of the information processing apparatus in the information processing system.

2. Description of the Related Art

Conventionally, in an information processing apparatus such as a digital camera, for transmitting image data to a personal computer (PC) through a wireless connection, a method for transferring the image data by using an e-mail address of the PC that is a transmission destination has been a possible approach. However, this method produces a problem that a structure of a digital camera becomes complicated and it is impossible to miniaturize or perform weight saving.

To enable attaching acquired image data to the e-mail to transmit the image data to the PC without making the structure complicated, an information processing apparatus such as a digital camera disclosed in Jpn. Pat. Appln. KOKAI Publication No. 2001-36791 has adopted the following method. That is, the digital camera transmits a structured document in order to set connection information to a computer network and address information of the e-mail in response to a request from a client apparatus (a PC). After this, the information processing apparatus receives the connection information, the address information and the setting request and sets the connection information and an address.

BRIEF SUMMARY OF THE INVENTION

According to a first aspect of the present invention, there is provided an information processing apparatus which includes a server function configured to provide one or more services to a client apparatus via a communication network, comprising:

a service ID generation unit configured to generate service IDs for each of the services and to associate the service IDs with the services for identifying the services;

a service ID transmission unit configured to transmit the service ID to at least one of the client apparatus and a discovery proxy server connected to the communication network via the communication network; and a service connection unit configured to connect a service to be specified by the service ID included a service connection inquiry with one of the client apparatus and the discovery proxy server that is an inquiry origin when the service connection inquiry has been made from the one of the client apparatus and the discovery proxy server.

According to a second aspect of the present invention, there is provided a client apparatus which is connected with a predetermined service in an information processing apparatus via a communication network, comprising:

a service ID transmission unit configured to transmit service ID of the predetermined service to a discovery proxy server connected to the communication network;

an information processing apparatus address acquisition unit configured o acquire an address of the information processing apparatus to be transmitted from the discovery proxy server in response to the transmission of the service ID; and a service connection unit configured to transmit the service ID of the predetermined service to the information processing apparatus by using the address of the information processing apparatus to connect the predetermined service.

According to a third aspect of the present invention, there is provided an information processing system, comprising a client apparatus, a discovery proxy server and an information processing apparatus configured to be communication with one another via a communication network, wherein the information processing apparatus includes:

- services which are usable by the client apparatus via the communication network; and
- a service ID generation unit configured to generate service IDs to identify the services for each of the services, the discovery proxy server includes a storage unit configured to store the service IDs and address information of the information processing apparatus, and the client apparatus includes:

- an acquisition unit configured to acquire service ID of the service from the information processing apparatus; and
- a service connection unit configured to acquire address information of the information processing apparatus from the discovery proxy server to connect to the service by using the acquired service ID.

According to a fourth aspect of the present invention, there is provided a service connection method, in an information processing system including a client apparatus, a discovery proxy server and an information processing apparatus configured to communicate with one another, which connects the client apparatus with predetermined service from the information processing apparatus, comprising:

generating service IDs for each service from the information processing apparatus;

storing the service ID and address information of the information processing apparatus by the discovery proxy server; and acquiring the address information of the information processing apparatus from the discovery proxy server by using the service ID of the predetermined service to be connected and connecting the client apparatus with the predetermined service when the client apparatus is connected with the predetermined service of the information processing apparatus.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a view depicting a configuration of an information processing system regarding a first embodiment of the invention;

FIG. 2A is a front view depicting an external appearance of a digital camera as an information processing apparatus or a client apparatus regarding the first embodiment;

FIG. 2B is a rear view depicting an external appearance of the digital camera of FIG. 2A;

FIG. 5 is a view depicting a communication process between the information processing apparatus and the client apparatus in a state of establishing the connection of the wireless LAN;

FIG. 6 is a view depicting a Simple Object Access Protocol (SOAP) section of a 'Hello' message;

FIG. 11 is a view depicting a configuration of an information processing system regarding a second embodiment of the invention;

FIG. 13 is a view depicting a communication path in a case in which the information processing apparatus is present out of a LAN where the client apparatus is present; and FIG. 14 is a view depicting a communication process between the information processing apparatus using the discovery proxy server and the client apparatus in FIG. 13.

DETAILED DESCRIPTION OF THE INVENTION

Figure 3:
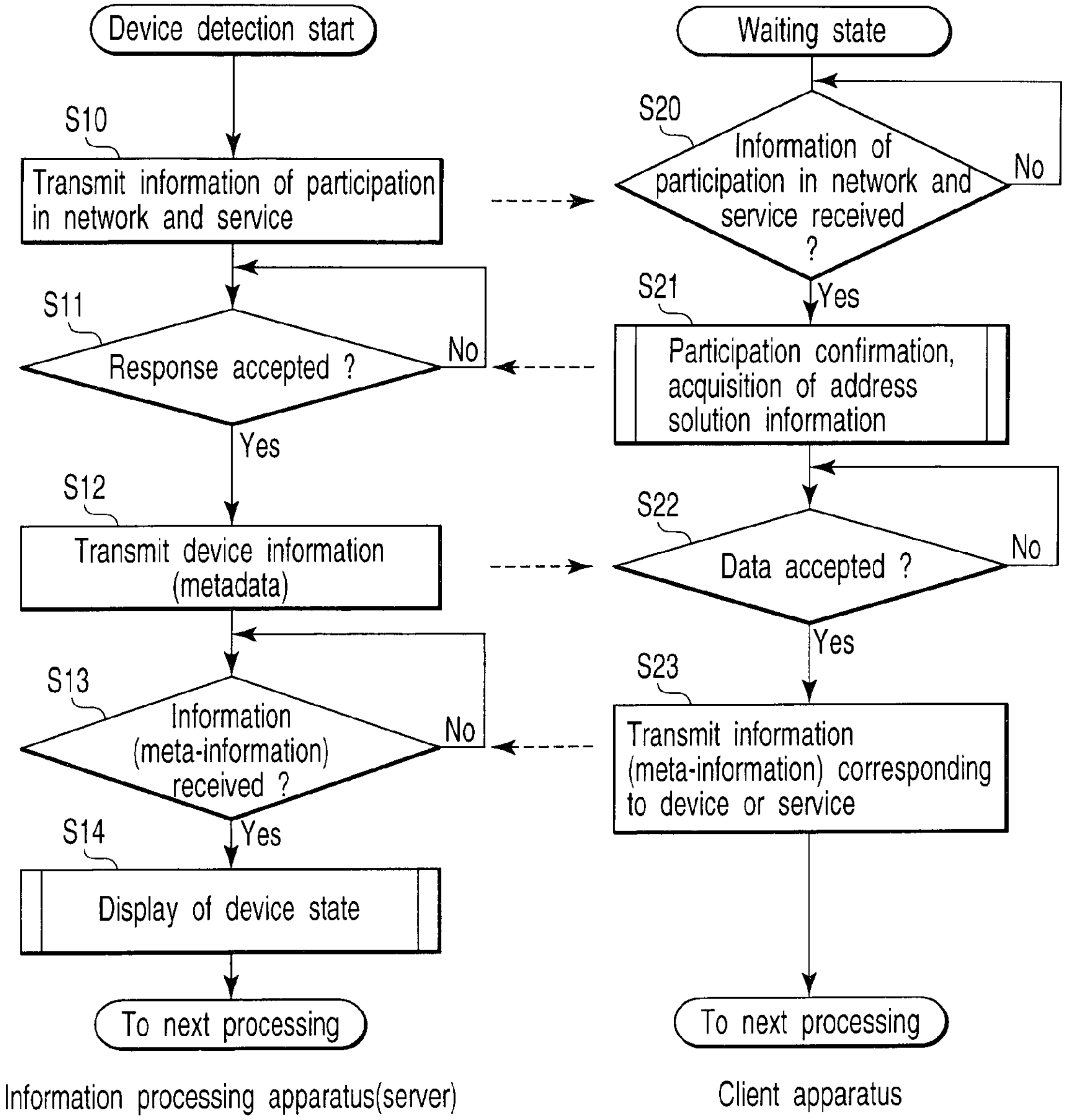
FIG. 3 is a view depicting operation flowcharts of a service execution unit of the information processing apparatus and a service execution unit of the client apparatus.

The following will describe the best form to implement the invention with reference to the drawings.

First Embodiment

As shown in FIG. 1, an information processing apparatus regarding a first embodiment of the invention is composed of an information processing apparatus 10A regarding a first embodiment of the invention which functions as a server, and a client apparatus 10B regarding a first embodiment of the invention to be wirelessly connected to the information processing apparatus 10A. Here, in the first embodiment, it is assumed that both the information processing apparatus 10A and the client apparatus 10B are digital cameras.

In a digital camera 10, as shown in FIG. 2A, a lens 12, a flash 14, and a recording microphone 16 are arranged on a surface to be a subject to be acquired an image, and a "POWER button 18 and a shutter button 20 are arranged on an upper surface. As shown in FIG. 2B, a liquid crystal monitor 22, a cross button 24, an "OK button 26, a menu button 28, a reproduction button 30, a zoom button 32, a loudspeaker 34, a green light-emitting diode (G-LED) 36, and an orange light-emitting diode (O-LED) 38 are arranged on a rear face that is a face on an opposite side to the lens 12. Among of them, it is preferable for the monitor 22 to be arranged on the same face on which the cross button 24, the "OK button 26, the menu button 28 and the reproduction button 30 are arranged.

The information processing apparatus 10A is composed of a camera function unit 40 as an image acquisition unit, an information terminal unit 42, an antenna 44, a storage medium 46, a digital-to-analog converter 48 and a LAN connector 50, as shown in FIG. 1.

The camera function unit 40 includes an image acquisition module 52 and image engine LSI 54. The image acquisition module 52 includes the lens 12 and an image acquisition element (not shown), etc. The image engine LSI 54 applies signal processing such as a gamma correction and white balance and also compression processing to an image signal obtained by the image acquisition module 52.

The information terminal unit 42 includes a service (application) execution unit 56 which is composed of a CPU and a memory, and functions as a service connection unit, an event information transmission unit and an image transmission unit. Further, the information terminal unit 42 is provided with an operation unit 58, the G-LED 36, the O-LED 38, a wireless LAN module 60 and the liquid crystal monitor 22 which as connected with the service execution unit 56.

Here, the service execution unit 56 controls various functions of the information terminal unit 42 as well as executes more than one service (application). The service execution unit 56 is configured to realize various functions owned by the information terminal unit 42 while the CPU sequentially applies processing to an information processing program stored in the CPU or in an external non-volatile memory, etc. The service execution unit 56 includes a universally unique identifier (UUID) generation unit 62 functioning as a service ID generation unit, a UUID transfer unit 64 functioning as a service ID transmission unit, an ICON association unit 66 and a data base information generation unit 68. The UUID generation unit 62 generates for each service a UUID described in Request for Comment (RFC) 4122 of which the technical specifications have been disclosed by the Internet Engineering Taskforce (IETF) and associates the UUID with the service. The UUID transfer unit 64 transfers the UUID generated and associated by the UUID generation unit 62 transfers outside thorough the wireless LAN module 60. The ICON association unit 66 associates the service and the connection destination device with an icon (referred to as ICON) as a GUI when the connection to the client apparatus 10B is started. The data base information generation unit 68 generates a database which associates the information processing apparatus 10A with the client apparatus 10B.

The operation unit 58 is composed of various buttons, for example, the POWER button 18, the shutter button 20, the cross button 24, the OK button 26, the menu button 28, the reproduction button 30, the zoom button 32, and the like. The G-LED 36 and the O-LED 38 are light emission units to notify the state of the information processing apparatus 10A to the user. For instance, the G-LED 36 is used in order to report the start/end of the service, the access state to the storage medium 46, etc. The O-LED 38 is used in order to report the connection/disconnection of the wireless LAN. That is, the G-LED 36 functions as a service state display unit to perform the start display of the service. The wireless LAN module 60 uses the antenna 44 to make wireless communication with the client apparatus 10B. The liquid crystal monitor 22 displays a picture image acquired by the camera function unit 40 and displays various items of information of the menu, the ICON, etc, in response to the operation by the operation unit 58 and the state of the service.

The storage medium 46 is a memory card, etc., to store the picture acquired by the camera function unit 40. The storage medium 46 may be built in the information processing apparatus 10A so as not to be removed therefrom, and may be freely attachable to and detachable from the information processing apparatus 10A.

The digital-to-analog converter 48 converts a message to report the state of the information processing apparatus 10A to the user into an analog sound signal and to produce sound through the loudspeaker 34.

The LAN connector 50 makes a wired-connection of the information processing apparatus 10A to the Internet.

Although the configuration of the client apparatus 10B is not shown particularly, the configuration thereof is the same as that of the client apparatus 10A.

Next, an outline of operations of the information processing system with such a configuration will be described.

As shown in FIG. 3, the service execution unit 56 of the information processing apparatus 10A firstly transfers network service participation information to start participation in a network to the client apparatus 10B (Step S10). The network service participation information is generated from the UUID generation unit 62 and includes a unique UUID, which identifies the information processing apparatus 10A itself, to be transferred by the UUID transfer unit 64.

When receiving the network service participation information, (Step S20), the service execution unit 56 of the client apparatus 10B executes participation confirmation and acquisition of address solution information (Step S21). That is, the service execution unit 56 performs to confirm participation in the network, and acquires the UUID of the information processing apparatus 10A from the network service participation information to perform address solution. The service execution unit 56 generates the UUID of the client apparatus 10B to transmit the UUID to the information processing apparatus 10A.

The information processing apparatus 10A checks the reception of the transmitted UUID (step S11), and transmits device information (metadata) including an attribute, etc., of the information processing apparatus 10A to the client apparatus 10B (Step S12).

The client apparatus 10B receives the metadata (step S22). The client apparatus 10B transmits device information, including the attribute, etc., of the client apparatus 10B and the information (meta-information) corresponding to the service such as a category (field) of the service, a certification number of the service, a name of a manufacturer, and a state of the device, to the information processing apparatus 10A (Step S23).

The information processing apparatus 10A determines the reception of the meta-information (Step S13), and displays the state of the device (Step S14). That is, the information processing apparatus 10A associates the service or the client apparatus 10B with the ICON by the ICON association unit 66. The database information generation unit 68 generates database to associate the information processing apparatus 10A with the client apparatus 10B by using the UUID, lights the G-LED 36, and reports the start of the service to the client apparatus 10B.

After this, the information processing apparatus 10A continuously provides services to the client apparatus 10B.

The following will describe the aforementioned operations in detail.

To start communication between the information processing apparatus 10A and the client apparatus 10B via the wireless LAN, the setting which is necessary for establishing initial setting of the communication is made on the information processing apparatus 10A and/or the client apparatus B. Thereby, the information processing apparatus 10A can start the communication with the client apparatus 10B and can reduce a processing amount on the client apparatus 10B at the start of the communication.

Conventionally, the information processing apparatus 10A and the client apparatus 10B have been connected through a Universal Serial Bus (USB) cable with each other, set information of the network has been exchanged to simply register the initial setting, and after this, the power source of the information processing apparatus 10A has been activated, and the communication has been made.

The IEEE 802.11 sequence utilizes a Service Set Identifier (SSID) as one of network identifiers in the wireless LAN. The SSID performs its part as so-called a name of the network.

In a case of a network configuration in an infrastructure mode, a network consisting one access point to be a basis and a plurality of wireless LAN terminals under the access point is called a Basic Service Set (BSS), and an identifier to be used at that time is called a BSSID. A network consisting of a plurality of BSSs is called an ESS; an identifier to be used at that time is called an extended SSID (ESSID) (in this specification, when any description is not included particularly, the SSID means the ESSID). The setting of the SSID prevents a connection to an unexpected network, identifies a terminal or a device to be connected. In other words, if the identical SSIDs are not set to the access point and to the wireless LAN terminal, the access point and the wireless LAN terminal becomes impossible to be connected with each other. Using this function enables limiting users in a certain extent. The access point periodically delivers packet data to be called a beacon. The beacon includes the name of the SSID of the access point which is needed for the wireless LAN terminal to be connected. Thereby, the wireless LAN terminals in a range where the radio wave is reachable are informed the presence of the access point. Using some set utility software enables knowing the name of the SSID. Therefore, the wireless LAN terminals automatically connect to the access point by setting the SSID though the beacon.

Figure 4:
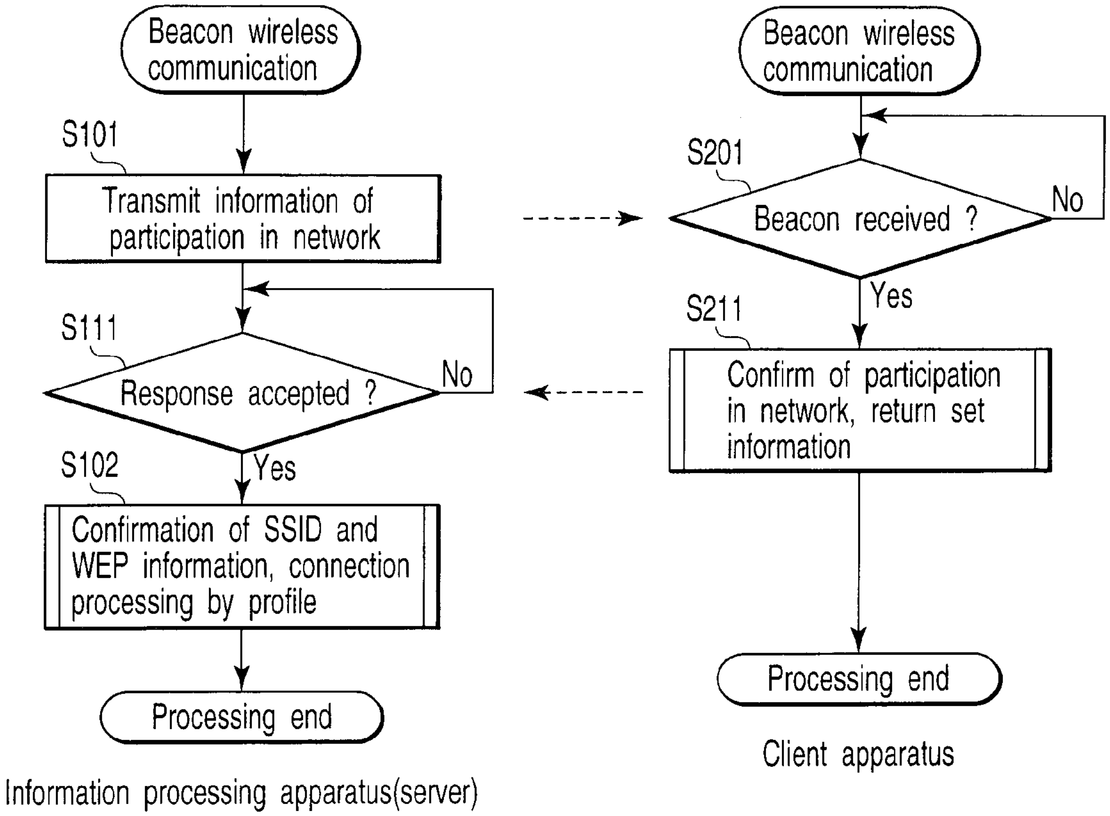
FIG. 4 is a view depicting flowcharts of wireless LAN connection establishment operations at the service execution unit of the information processing apparatus and the service execution unit of the client apparatus in a case of using an IEEE 802.11 sequence.

FIG. 4 shows the wireless LAN connection establishment operations at the service execution unit 56 of the information processing apparatus 10A and at the service execution unit 56 of the client apparatus 10B in the information processing system regarding the embodiment in the case of using such an IEEE 802.11 sequence.

Firstly, the information processing apparatus 10A transmits the beacon including the information of the participation in the network to start the participation in the network by using the IEEE 802.11 sequence (Step S101). The participation in the network includes the unique UUID which is generated from the UUID generation unit 62 and transferred by the UUID transfer unit 64 to identify the information processing apparatus 10A itself and includes the SSID. The participation in the information is also referred to as a connection inquiry signal.

When the LAN module 60 receives the beacon via the antenna 44 (Step S201), the service execution unit 56 of the client apparatus 10B confirms the participation in the network to return the set information (Step S211). The service execution unit 56 detects the device (information processing apparatus 10A) by the received beacon to detect the UUID. The service execution unit 56 determines whether or not the client apparatus 10B is connectable with the network by previously determining whether or not the UUID has been registered in the client apparatus 10B as permission of the connection. If the permission of the connection has been registered, the client 10B is connected with the network. The service execution unit 56 transfers the UDDI generated to be the IP address of the client apparatus 10B or the address information of the URL to the information processing apparatus 10A as the set information from the UUID transfer unit 64.

The information processing apparatus 10A accepts the response from the client apparatus 10B (Step S111). The information processing apparatus 10A confirms the SSID and Wire Equivalent Privacy (WEP) information which is shown an encryption system of the wireless LAN, and executes connection processing in accordance with a profile that is the set information corresponding to the SSID and the WEP information (Step S102). Then, if the wireless LAN has been established, the information processing apparatus 10A lights the O-LED 38 to report the connection of the wireless LAN.

FIG. 5 shows the communication process between the information processing apparatus 10A and the client apparatus 10B in a state of establishing the connection of the wireless LAN in the aforementioned way.

At first, the information processing apparatus 10A transfers an announcement of participation in network (Hello) to the client apparatus 10B.

Unique ID code (UUID) identifying the service is generated prior to the announcement of the participation in the network. As regards a generation method of the UUID, a method for generating the UUID by a random function, a method for generating random values on the basis of predetermined data, and the like are possible approaches. As regards the predetermined data, time setting preliminarily set in the information processing apparatus 10A, user information such as handle information of the network, a manufacturing number of the information apparatus 10A, a unique number recorded in the CPU, and a unique number stored in the storage medium 46, etc., can be used.

In the embodiment, for example, the information processing system performs data transfer by using a simple communication protocol in order to access an object on the network in Simple Object Access Protocol (SOAP) for making the network communication. That is, in the embodiment, the client apparatus 10B transmits request information (information which of the services is required to be used and a parameter needed to execute the service) to the information processing apparatus 10A, and the information processing apparatus 10A needs to respond the result to the client apparatus 10B. Therefore, it is necessary for a rule of the transmission and the reception to be defined in advance.

A merit of SOAP is expandability. In a case of transmitting and receiving information among applications, incidental information may be required other than real data. In the case of the Hypertext Transfer Protocol (HTTP), a method for separating a main part of the data from the incidental information and transmitting the incidental information by using an HTTP header is a possible approach. Kind of content, data length, and user ID/password in basic authentication are recorded in the HTTP header. However, if the transmission and reception of the incidental information is left to the HTTP header, a problem, such that the transmission and reception means of the information depend on the HTTP protocol, is produced. Therefore, SOAP has been developed as a means for transmitting and receiving the information independent of protocol. SOAP transmits and receives the data described below. FIG. 6 shows a view illustrating the SOAP part of the Hello message.

(1) Protocol Binging Header Part (Not Shown):

This is header information depending on a lower order protocol to be used. A server (information processing apparatus 10 in the embodiment) recognizes that the request information is a SOAP message on the basis of the information described in the protocol binding header part. The protocol binding header part is described at the first section of an XmL.

(2) SOAP Envelope Part 70 (Between <s:Envelope> and </s:Envelope> in FIG. 6):

The SOAP Envelop part 70 shows an entire SOAP message. As shown in FIG. 6, the content of the SOAP Envelope part 70 is further classified into a SOAP Header part 72 and a SOAP main part 74.

(2-1) The SOAP Header Part 72 (Between <s:Header> and </s:Header> in FIG. 6):

The SOAP header part 72 expresses incidental information to be transmitted aside from a data main part.

(2-2) The SOAP Main Part 74 (Between <s:Body> and </s:Body> in FIG. 6):

The SOAP main part 74 is a part to be a core of the SOAP message, and expresses the data main part. The SOAP main part 74 expresses information of a name of a service (name of a method) to be concretely called out and of a parameter needed to execute.

In the embodiment, as shown in FIG. 6, each UUID 76 is embedded in the SOAP header unit 72 and the SOAP main part 74 to transmit and received.

When receiving the announcement of the participation in the network transmitted in such a SOAP form, the client apparatus 10B, as shown in FIG. 5, responds a service connection inquiry (Probe) as a signal of the permission of the participation. When receiving the service connection inquiry, the information processing apparatus 10A transmits a connection response (Probe Match) including the unique ID code (UUID) identifying the service to the client apparatus 10B. When receiving the connection response, the client apparatus 10B transmits an address setting request (Resolve) in order to acquire the address of the information processing apparatus 10A.

In response to the address set request, the information processing apparatus 10A transmits a connection destination address update (Resolve Match) in order to notify the address of the information processing apparatus 10A. Thereby, the address of the information processing apparatus 10A is registered in the client apparatus 10B, and the client apparatus 10B enables solving the address of the information processing apparatus 10A.

Next, the client apparatus 10B transmits a metadata transmission request (authentication data request) so as to acquire the metadata of the information processing apparatus 10A. At this time, the client apparatus 10B also transmits meta-information of the client apparatus 10B. That is, the client apparatus 10B recognizes the UUID of the service transmitted from the information processing apparatus 10A and transmits the meta-information including the UUID. Thereby, the information processing apparatus 10A recognizes the client apparatus 10B as the processor 10A's own client.

The information processing apparatus 10A performs a metadata transmission (device information data transmission) in order to notify the metadata in response to the metadata transmission request.

When the client apparatus 10B receives the metadata, the ICON association unit 66 associates an ICON with the service and the connection destination device by means of the UUID, and reports that the information processing apparatus 10A has participated in the network by displaying the ICON on the liquid crystal monitor 22 and by reproducing a report sound from the loudspeaker 34.

Figure 7:
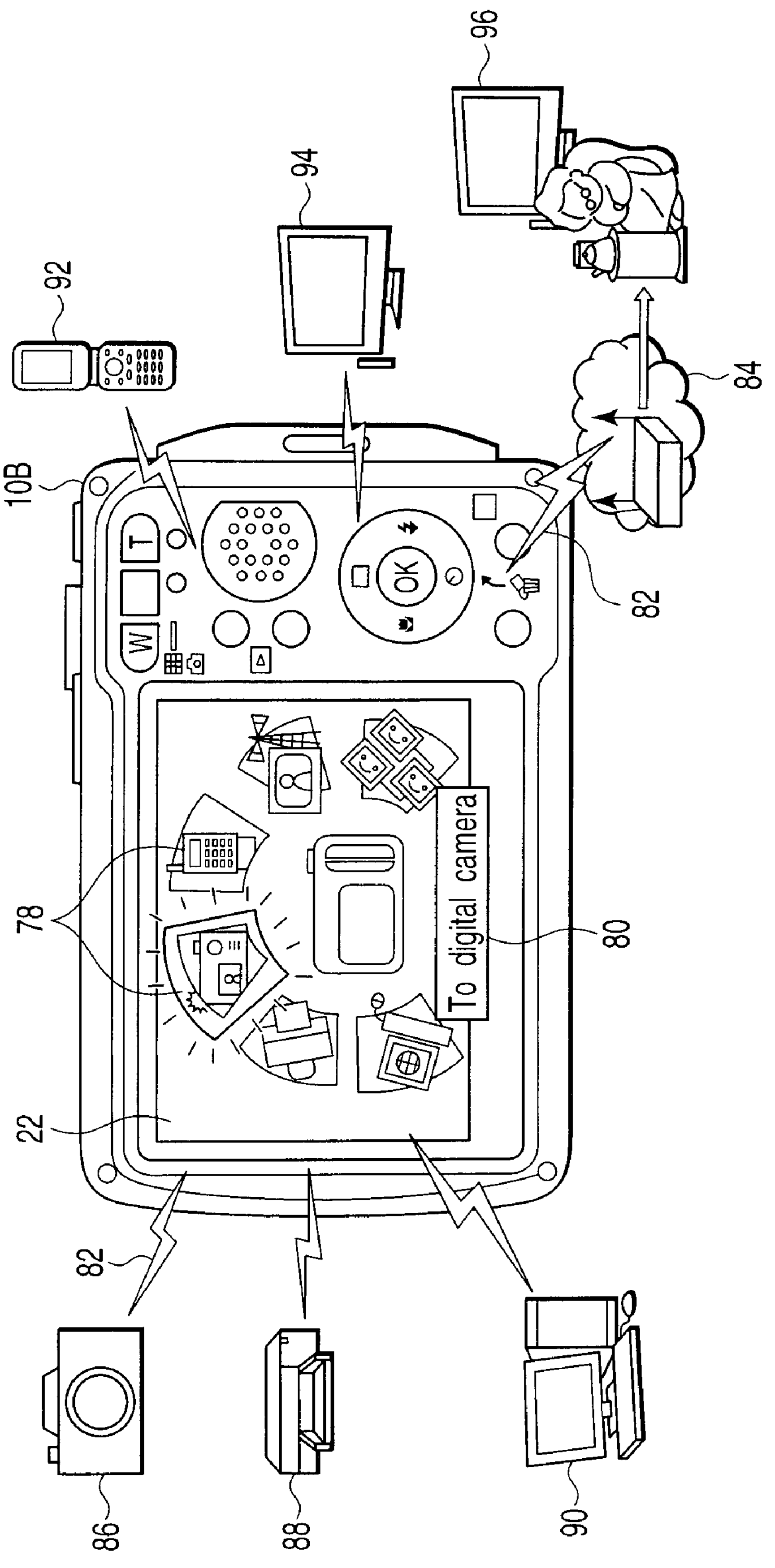
FIG. 7 is a view depicting a display example in order to notify a connectable device.

For instance, as shown in FIG. 7, the client apparatus 10B displays the devices which have been stored as the database and connected already by the use of ICONs 78. Among of the ICONs 78, the ICONs 78 of the devices, which are capable of being used when the devices are connected to the network, are applied highlighted displays in such a manner to be displayed clearly so as to notify the state in which the devices are available to the user. The ICONs 78 of unavailable devices are displayed in a gray scale, or the like, and displayed so as to be distinguished from the ICONs 78 of the available devices. Alternatively, the devices which are intending to be connected may be displayed with a character display 80. The image data of the ICONs 78 and alarm sounds are may be prepared in the client apparatus 10B from the first, and may be supplied as a part of the metadata to be transmitted from the information processing apparatus 10A.

In FIG. 7, a reference number 82 indicates the wireless LAN and a reference number 84 indicates the Internet. The reference numbers 86, 88, 90, 92, 94 and 96 indicate a digital camera, a printer, a personal computer (PC), a cellular phone with a wireless LAN connection function, a television receiver with a wireless LAN connection function at its own residence, and a television receiver with an Internet 84 connection function, respectively.

When the highlighted ICON 78 is clicked, namely the ICON 78 is selected by operating the cross button 24 and the "OK button 26 is pressed, the ICON 78 is decided to start the service. That is, in this stage, the user operates for the first time. With the start of the service, the client apparatus 10B transmits a service start request to the information processing apparatus 10A.

The information processing apparatus 10A returns a service start showing the reception of the service start request in response to the reception thereof, reports the start of the service by lighting the G-LED 36 and reproducing a report sound from the loudspeaker 34.

Figure 8:
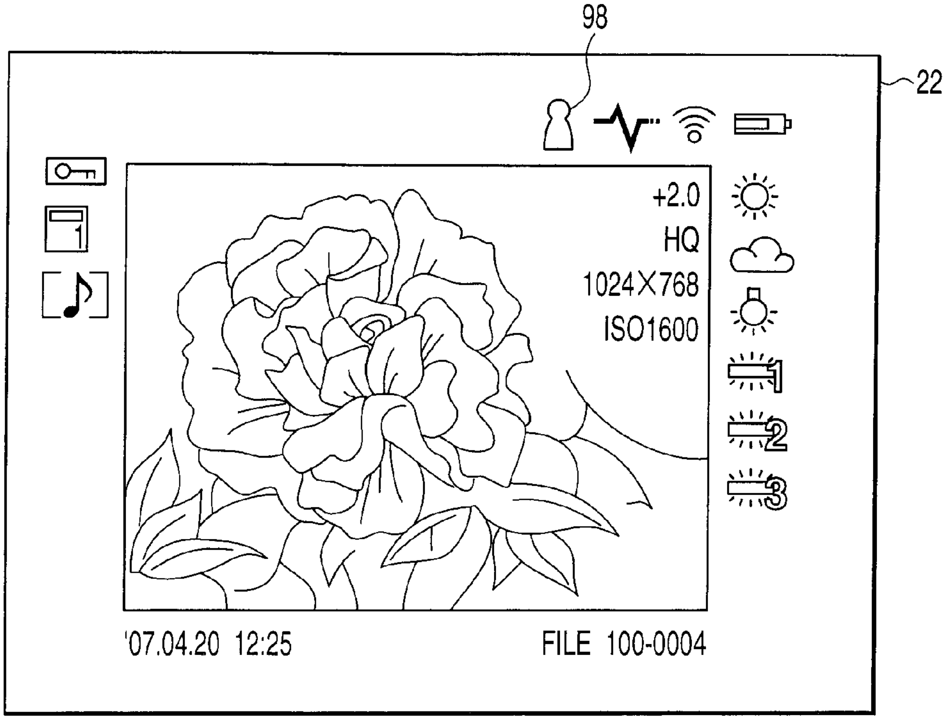
FIG. 8 is a view depicting a display example of a service start display.

Meanwhile, the client apparatus 10B which has been reported the service start from the information processing apparatus 10A, as shown in FIG. 8, for example, notifies the start of the service by a display of a service start indication ICON 98, and by a reproduction of a report sound from the loudspeaker 34. After the data base information generation unit 68 generates a database in which the information processing apparatus 10A and the client apparatus 10B are associated with each other by means of the UUID, the client apparatus 10B waits for the transmission of an event data transfer (transfer event) from the information processing apparatus 10A.

Of course, the information processing apparatus 10A, at the start of the service, may lights the G-LED 36 and also displays the service start indication ICON 98 on the liquid crystal monitor 22 in the same way as that of the client apparatus 10B.

Hereinafter, one service to be provided from the information processing apparatus 10A will be described by giving an example of a picture provision service by which, for example, acquiring a picture with the digital camera that is the information processing apparatus 10A in a party room to transmit the picture data to the digital camera of the participant that is the client apparatus 10B.

In such a picture provision service, in the party room, when a user having the client apparatus 10B enters a service area of the information processing apparatus 10A, the connection of the wireless LAN is automatically established; a service is started by a click operation of the ICON 78. When an event to acquire a picture with the information processing apparatus 10A occurs, the event data showing the event content is transferred to the client apparatus 10B. The client apparatus 10B receives the event data, blinking-displays the ICON 78 in order to notify that the data is now in transmission to the user, and makes a transfer request (picture transmission request) to the information processing apparatus 10A.

The information processing apparatus 10A receives this transfer request to transfer the picture data to the client apparatus 10B. During transference of the picture data, to report the fact to the user, the information processing apparatus 10A blinks the G-LED 36 or sounds the report sound reporting to be in transmission of the picture data from the loudspeaker 34.

After terminating the picture data transference, the client apparatus 10B retunes the ICON 78 to a lighting-display to report the end of the data transmission to the user. The information processing apparatus 10A reports the end of the data transmission to the user by lighting the G-LED 36 or by reproducing the report sound corresponding to the end of the data transmission from the loudspeaker 34.

Like this, for every occurrence of an event, the picture data is transferred.

At the time of the end of the party, the information processing apparatus 10A transfers an end request event requesting the end of the service to the client apparatus 10B. The client apparatus 10B returns the response of receiving the end request event. The information processing apparatus 10A receives the response, and transmits a disconnection message (Bye) to the client apparatus 10B. The client apparatus 10B ends the service in accordance with the disconnection message. At this moment, the client apparatus 10B turns off the ICON 78 as the display of the end of the service then reports the end of the service to the user. The information processing apparatus 10A turns off the G-LED 36 and sounds the report sound reporting the end of the service from the loudspeaker 34 so as to report the end of the service to the user. The information processing apparatus 10A clears the database in which the information processing apparatus 10A and the client apparatus 10B are associated with each other by the UUID.

Figure 9:
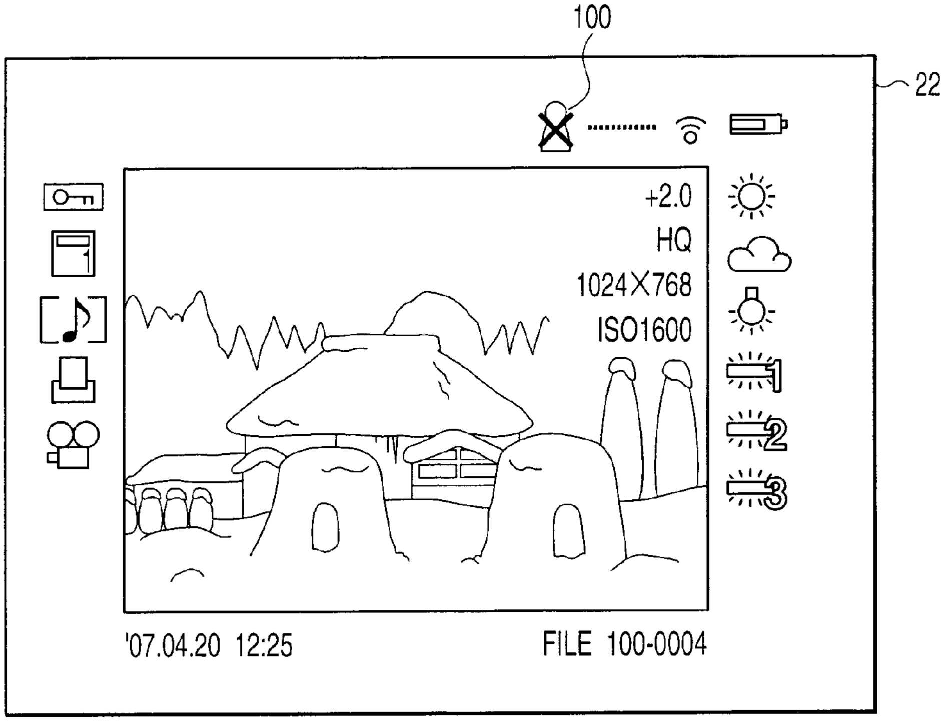
FIG. 9 is a view depicting a display example at an abnormal disconnection of a service.

If the service has come to an abnormal end before the end request event is transmitted, the information processing apparatus 10A displays a service disconnection display ICON 100 such as shown in FIG. 9 on the liquid crystal monitor 22 then reports the abnormal end to the user.

Figure 10:
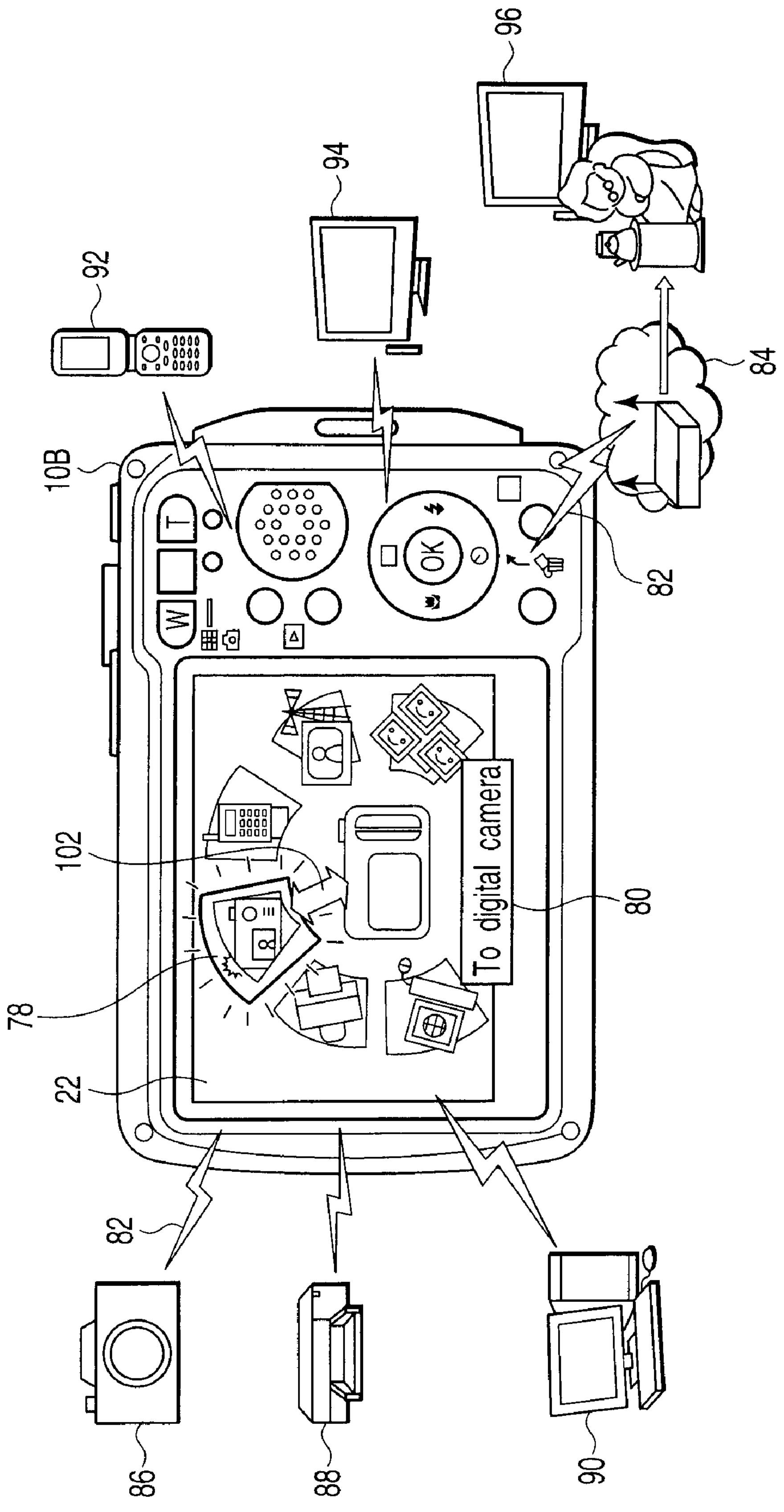
FIG. 10 is a view depicting a display example in picture data transference.

While the embodiment has described that the blinking of the ICON 78 reports the transference of the picture data, an animation display or blinking display of a connection arrow 102 as shown in FIG. 10 can be used. Further, in actual transference of the picture data, the information processing apparatus 10A may thickly display the arrow 102, and when the transference comes to an end, the information processing apparatus 10A may display the fact with a thin line to display only the fact of being connected.

Further, the information processing apparatus 10A may be provided with stereophonic loudspeakers to sound the report sound from the direction of the selected ICON 78.

As mentioned above, according to the first embodiment, the information processing apparatus 10A having a server function configured to provide one or more services to the client apparatus 10B via the communication network includes the UUID generation unit 62 which generates the service IDs for the respective services in order to identify the services and associates the service IDs with the services, the UUID transfer unit 64 which transmits the service IDs to the client apparatus 10B via the communication network, and the service execution unit 56 which connects the client apparatus 10B that is the inquiry origin to the services specified by the service IDs included in the service connection inquiry when the client apparatus 10B issues the service connection inquiry. Thereby, the client apparatus 10B finds the information processing apparatus 10A that is the available server device by being connected to the communication network and allows the user selecting the information processing apparatus 10A to simply perform the connection setting. That is, when the user expects to use the wireless communication out of doors, the user can easily find the available communication. Accordingly, even when the connection destinations are frequently varies, such the information processing apparatus 10A as a portable camera, the information processing system may easily switch over the connection destinations to connect them and provide the services.

Second Embodiment

The second embodiment is an example in which the information processing apparatus 10A accesses the client apparatus 10B through a discovery proxy server on the Internet to confirm the participation in the network and make a connection to a service.

The information processing system according the second embodiment includes, as shown in FIG. 11, the information processing apparatus 10A, the client apparatus 10B and the discovery proxy server 104 configured to mutually communicate via the communication network. The information processing apparatus 10A is configured as the digital camera such as described in the first embodiment, and the discovery proxy server 104 stores the UUIDs of the services from the information processing apparatus 10A and the address information of the information processing apparatus 10A. The client apparatus 10B is configured as the PC, acquires the UUIDs of the services, and acquires the address information of the information processing apparatus 10A from the discovery proxy server 104 by using the UUIDs to connect to the services.

In the same way as described for the first embodiment, the connection of the wireless LAN is established through an Internet gateway device (IGD) 106 such as a WiFi router shown as (1) in FIG. 11.

Figure 12:
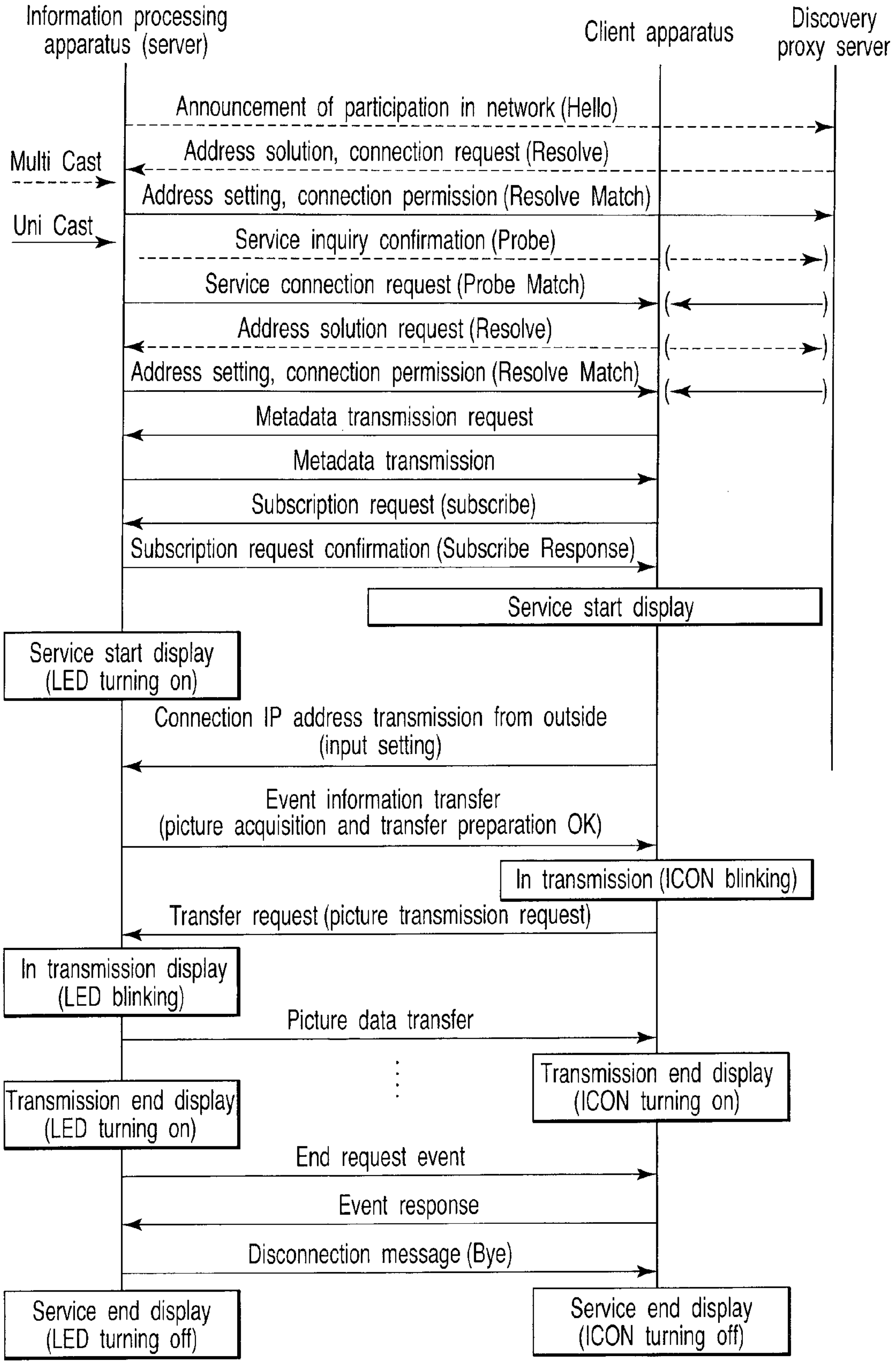
FIG. 12 a view depicting a communication process between an information processing apparatus and a client apparatus using a discovery proxy server in a state of establishing the connection to the wireless LAN.

FIG. 12 shows a communication process between the information processing apparatus 10A using the discovery proxy server 104 and the client apparatus 10B shown as (2) in FIG. 11 in a state in which the connection of the wireless LAN through the IGD 106 has been established. In FIG. 12, arrows of broken lines indicate multicast and arrows of solid lines indicate unicast.

Firstly, the information processing apparatus 10A transmits a 'Hello' message in the multicast in order to notify the participation in the network. In the embodiment, in the same way as that of the first embodiment, the information processing apparatus 10A transmits the message in the SOAP form with the UUID 76 embedded therein.

When receiving the announcement of participation in network, the discovery proxy server 104 transmits an address solution, connection request (Resolve) by the multicast in order to acquire the address information of the information processing apparatus 10A that is the transmission origin. The information processing apparatus 10A transmits an address setting, connection permission (Resolve Match) to the discovery proxy server 104 that is the transmission origin by the unicast in order to notify the address information of the information processing apparatus 10A in response to the reception of the address solution, connection request. Thereby, the address information of the information processing apparatus 10A is registered in the discovery proxy server 104 and the address solution of the information processing apparatus 10A in the discovery proxy server 104 becomes able.

When receiving the announcement of participation in network which has been transmitted by the multicast from the information processing apparatus 10A, the client apparatus 10B transmits a service inquiry confirmation (Probe) by the multicast in order to retrieve the device. For this transmission, the information processing apparatus 10A and the discovery proxy server 104 in activation make responses, and transmit a service connection request (Probe Match) by the unicast to the client apparatus 10B that is the transmission origin. The service connection request to be transmitted from the discovery proxy server 104 includes the address information of the discovery proxy server 104.

With the service connection request received, the client apparatus 10B transmits an address solution request (Resolve) by the multicast in order to acquire the address information of the information processing apparatus 10A. In response to the reception, the information processing apparatus 10A transmits an address setting, connection permission (Resolve Match) to the client apparatus 10B of the transmission origin by the unicast so as to notify the address information of the information processing apparatus 10A. The discovery proxy server 104 with the address information of the information processing apparatus 10A grasped therein also transmits the address information of the information processing apparatus 10A by the unicast to the client apparatus 10B. Thereby, the client apparatus 10B is brought into a state of grasping the address information of the information processing apparatus 10A.

Next, the client apparatus 10B transmits a metadata transmission request to the information processing apparatus by the unicast in order to acquire the metadata of the information processing apparatus 10A. At this moment, the meta-information of the client apparatus 10B is also transmitted. The information processing apparatus 10A then transmits the metadata to the client apparatus 10B by the unicast in response to the metadata transmission request.

The client apparatus 10B then transmits a subscription request (Subscribe) to the information apparatus 10A by the unicast in order to subscription registration of the information processing apparatus 10A. In response to this request, the information processing apparatus 10A turns on the G-LED 36, and reproduces the report sound from the loud speaker 34 to notify the start of the service. The information processing apparatus 10A transmits a subscription request confirmation (Subscription Response) to the client apparatus 10B by the unicast so as to notify the acceptance of the subscription registration. In this case, the information processing apparatus 10A automatically generates the unique ID code (UUID) to identify the service, and transmits the UUID by including it in the request confirmation. The information processing apparatus 10A generates the database in which the information processing apparatus 10A and the client apparatus 10B are associated with each other by means of the UUID.

With the reception of the subscription request confirmation, the client apparatus 10B is brought into a state capable of receiving the event of the information processing apparatus 10A. The ICON association unit 66 associates the connection destination device with the ICON by the UUID. The client apparatus 10B reports that the information processing apparatus 10A has participated in the network by displaying the ICON 78 on the liquid crystal monitor 22 and by report sound from the loudspeaker 34.

Although not shown specifically, the UUID is also transmitted to the discovery proxy server 104 to be recorded therein. Thereby, in response to the inquiry for the UUID, the retrieval of the registration information is performed, and if the UUID registered in advance is found, the authentication may be performed. That is, it becomes able to confirm that the information processing apparatus 10A having the wired or wireless network (capable of communicating in an infrastructure mode) communication function built-in has participated in the network.

In the client apparatus 10B, when the ICON 78 is clicked, the service is started. In this stage, the user may operate for the first time. As the service starts, the client apparatus 10B transmits a connection IP address transmission from outside (input setting) by the unicast. Thereby, the information processing apparatus 10A associates the IP address of the discovery proxy server 104 capable of being connected from the outside with the UUID to store the IP address (Registration of UUID) as the information for communicating an event from a global network (WAN). The IP address of the discovery proxy server 104 is the IP address (global address or WAN address) on the side of the Internet 84 of the IGD 106.

When an event to acquire a picture image with the information processing apparatus 10A, the event information (an image acquisition and transfer preparation OK) showing the content of the event is transferred to the client apparatus 10B by the unicast. The client apparatus 10B received this event information, displays the ICON 78 in a blinking manner in order to report to the user that the data is in transmission, and also makes a transfer request (a picture transmission request) to the information processing apparatus 10A in the unicast.

The information processing apparatus 10A receives the transfer request and transfers the picture data to the client apparatus 10B by the unicast. In transference of the picture data, to report the transference to the user, the information processing apparatus 10A blinks the G-LED 36 and sounds a report sound reporting that the picture data is in transmission from the loudspeaker 34.

When the transference of the picture data ends, the client apparatus 10B returns the ICON 78 to the lighting display then reports the end of the data transmission to the user. The information processing apparatus 10A reports the end of the data transmission by lighting the G-LED 36 or reproducing the report sound corresponding to the end of the data transmission from the loudspeaker 34.

Like this, for each occurrence of the event, the picture data is transferred.

When the information apparatus 10A transmits an end request event requesting for the end of the service to the client apparatus 10B by the unicast, the client apparatus 10B returns an event response showing the acceptance of the end request event by the unicast. With the reception of the response, the information processing apparatus 10A transmits a disconnection message to the client apparatus 10B by the unicast. The client apparatus 10B ends the service in accordance with the disconnection message. At this moment, the client apparatus 10B turns off the ICON 78 as the display of the end of the service then reports the end of the service to the user. The information processing apparatus 10A reports the end of the service to the user by turning off the G-LED 36 and by reproducing the report sound reporting the end of the service from the loudspeaker 34.

As mentioned above, the information processing apparatus 10A may provide the service to the client apparatus 10B within the wireless LAN area.

Further, in the embodiment, as described below, the information processing apparatus 10A can provide the service from the outside of the wireless LAN area to the client apparatus 10B.

That is, the information processing apparatus 10A stores the IP address (IP address of the discovery proxy server 104) and/or port number on the side of the Internet 84 of the IGD 106 which can be connected from the outside in the aforementioned way by associating the IP address and/or port number with the UUID. As shown in FIG. 13, at the outdoors destination, etc., the information processing apparatus 10A is connected with the discovery proxy server 104 via the Internet 84 through an access point (AP) 108 such as a hotspot by the IP address (WAN address) information. The information processing apparatus 10A transmits the state thereof to the client apparatus 10B, or the client apparatus 10B transmits the state thereof to the information processing apparatus 10A, and if the client apparatus 10B is available, the client apparatus 10B displays the ICON 78 to make the client apparatus 10B selectable.

More specifically, the IP address (WAN address) of the information processing apparatus 10A varies for every connection with the Internet 84 via the AP 108. Then, as shown in FIG. 14, the information processing apparatus 10A transmits the announcement of the participation in the network (Hello) to notify the change in address information to the discovery proxy server 104 in accordance with the stored IP address information of the discovery proxy server 104 which is associated with the UUID. This announcement includes the UUID. With the reception of this announcement, the discovery proxy server 104 updates the connection destination (address information) of the information processing apparatus 10A to be stored in the discovery proxy server 104.

When the update has been notified to the client apparatus 10B, the client apparatus 10B transmits the address solution request (Resolve) to the discovery proxy server 104 in order to acquire the address information of the information processing apparatus 10A. The address solution request includes the UUID which has been used in associating the service and the connection destination device with the ICON as mentioned for FIG. 12. In response to the address solution request, the discovery proxy server 104 transmits the address solution response (Resolve match) to the client apparatus 10B in order to notify the updated address information of the information processing apparatus 10A. Thereby, the client apparatus 10B grasps the address information of the information processing apparatus 10A and enters a state capable of receiving the event of the information processing apparatus 10A. The client apparatus 10B reports that the information processing apparatus 10A has participated in the network by displaying the ICON 78 on the liquid crystal monitor 22 on the basis of the database in which the service and the connection destination are previously associated with the ICON or by the report sound from the loudspeaker 34.

To confirm the address information of the client apparatus 10B, the information processor 10A transmits the address solution request (Resolve) to the discovery proxy server 104. In response to this transmission, the discovery proxy server 104 transmits the address solution response (Resolve Match) to the information processing apparatus 10A in order to notify the address information of the client apparatus 10B. Thereby, the information processing apparatus 10A reports the start of the service by lighting the G-LED 36 and by reproducing the report sound from the loudspeaker 34.

When an event to acquire a picture image with the information processing apparatus 10A occurs, to notify the event, the information processing apparatus 10A transmits 'picture transfer preparation OK' to the client apparatus 10B. When receiving the notification, the client apparatus 10B transmits the address solution request (Resolve) to the discovery proxy server 104 in order to confirm the address information of the information processing apparatus 10A. In response to this, the discovery proxy server 104 transmits the address solution response (Resolve Match) to the client apparatus 10B so as to notify the address information of the information processing apparatus 10A. In response to the reception of the address solution request, the client apparatus 10B displays the ICON 78 in a blinking manner so as to report to the user that the client apparatus 10B is in transmission of the data. The client apparatus 10B transmits the transfer request (picture transmission request) to the information processing apparatus 10A in accordance with the received address information in order to acquire the picture data. The transfer request includes the UUID.

With the reception of the transfer request, the information processing apparatus 10A blinks the G-LED 36 or sounds the report sound from the loudspeaker 34 reporting that the information processing apparatus 10A is in transmission of the data and also transfers the picture data to the client apparatus 10B. When the transfer of the picture data ends, the client apparatus 10B reports the end of the data transmission to the user by returning the ICON 78 to the state of the display in the blinking manner. By lighting the G-LED 36 or by reproducing the report sound corresponding to the end of the data transmission from the loudspeaker 34, the information processing apparatus 10A repots the end of the data transmission to the user.

In this way, for each occurrence of the event, the picture data is transferred.

When the information processing apparatus 10A transmits the end request event to request for the end of the service to the client apparatus 10B, the client apparatus 10B returns the event response reporting the reception of the end request event. With the reception of the response, the information processing apparatus 10A transmits the disconnection message to the client apparatus 10B. The client apparatus 10B ends the service in accordance with the disconnection message. At this moment, the client apparatus 10B reports the end of the service to the user by turning off the ICON 78 as the display of the end of the service. The information apparatus 10A reports the end of the service to the user by turning off the G-LED 36 or by reproducing the report sound reporting the end of the service from the loudspeaker 34.

In this way, connecting the information processing apparatus 10A to the wires LAN area composed in a house, etc., from the out doors, etc., enables the client apparatus 10B to be provided with the service.

While the invention has described on the basis of the embodiments, the invention is not limited to the described embodiments, it goes without saying that this invention may be embodied in various forms without departing from the spirit or scope of the general inventive concept thereof.

For instance, while the information processing apparatus 10A has described by taking the digital camera 10 as the example, the information processing apparatus 10 may be other portable device such as a portable content reproduction device, a PDA, a cellular phone having a storage medium with a large capacity to store a large volume of content data such as picture images and music built-in. Similarly, the client apparatus 10B is not limited to the digital camera 10 or the PC.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An information processing apparatus which includes a server function configured to provide one or more services to a client apparatus via a communication network, comprising:

a service ID generation unit configured to generate service IDs for the respective services to associate the service IDs with the services for identifying the services;

a service ID transmission unit configured to transmit a declaration of participation in the communication network and the service ID to at least one of the client apparatus and a discovery proxy server connected to the communication network when the information processing apparatus participates in the communication network; and a service connection unit configured to transmit, when the at least one of the client apparatus and the discovery proxy server has made an inquiry on an address solution based on the service ID, information on an IP address of the information processing apparatus in the communication network to the at least one of the client apparatus and the discovery proxy server that made the inquiry, and then provide the respective service specified by the service ID to the at least one of the client apparatus and the discovery proxy server using the IP address.

2. The information processing apparatus according to claim 1, wherein each of the service IDs includes a unique UUID.

3. The information processing apparatus according to claim 2, wherein each of the service IDs is generated on the basis of one of set time information, a manufacturing number of the apparatus, an ID recorded in an inner CPU, an ID recorded in a memory card and user information.

4. The information processing apparatus according to claim 2, wherein the service connection unit start to provide the service after an address solution processing and an attribute information exchange to and from the one of the client apparatus and the discovery proxy server.

5. The information processing apparatus according to claim 4, further comprising:

an event information transmission unit configured to transmit event information to the client apparatus when an event occurs.

6. The information processing apparatus according to claim 5, further comprising:

an image acquisition unit configured to acquire an image; and an image transmission unit configured to transmit the image acquired by the image acquisition unit to the client apparatus, wherein the event information transmission unit transmits the event information to the client apparatus when the image is acquired by the image acquisition unit, and the image transmission unit transmits the image in response to an image transmission request to be transmitted from the client apparatus after transmitting the event information.

7. The information processing apparatus according to claim 4, wherein the information processing apparatus may be portable.

8. The information processing apparatus according to claim 4, wherein the information processing apparatus is a camera.

9. The information processing apparatus according to claim 4, further comprising:

a service state display unit configured to display a start of a service in response to the one of the attribute information exchange and the address solution processing.

10. An information processing system, comprising a client apparatus, a discovery proxy server and an information processing apparatus according to claim 1 configured to be in communication with one another via a communication network, wherein the client apparatus includes:

an acquisition unit configured to acquire the service ID of the respective service from the information processing apparatus; and a service connection unit configured to acquire, by using the acquired service ID, the information on the IP address of the information processing apparatus from the discovery proxy server to use the respective service.

11. A service connection method, in an information processing system including a client apparatus, a discovery proxy server and an information processing apparatus configured to communicate with one another, which connects the client apparatus to use services from the information processing apparatus, comprising:

generating service IDs for the respective services from the information processing apparatus;

transmitting, by the information processing apparatus, a declaration of participation in the communication network and the service ID to at least one of the client apparatus and the discovery proxy server when the information processing apparatus participates in the communication network;

making an inquiry on an address solution based on the service ID by the at least one of the client apparatus and the discovery proxy server;

transmitting, by the information processing apparatus, information on an IP address of the information processing apparatus in the communication network to the at least one of the client apparatus and the discovery proxy server that made the inquiry in response to the inquiry on the address solution;

providing, by the information processing apparatus, the respective service specified by the service ID to the at least one of the client apparatus and the discovery proxy server using the IP address;

storing, by the discovery proxy server, the service IDs and the information on the IP address of the information processing apparatus in association with each other; and acquiring, by the client apparatus, the service ID from the information processing apparatus, and by using the acquired service ID, acquiring the information on the IP address of the information processing apparatus to use the respective service.

12. An information processing system, comprising:

a client apparatus and an information processing apparatus according to claim 1 configured to be in communication with one another via a communication network, wherein the client apparatus includes:

an acquisition unit configured to acquire the service ID of the respective service from the information processing apparatus; and a service connection unit configured to acquire, by using the acquired service ID, the information on the IP address of the information processing apparatus to use the respective service.

13. A service connection method, in an information processing system including a client apparatus and an information processing apparatus configured to communicate with one another, for the client apparatus to use services from the information processing apparatus, comprising:

generating service IDs for the respective services from the information processing apparatus;

transmitting, by the information processing apparatus, a declaration of participation in the communication network and the service ID to the client apparatus when the information processing apparatus participates in the communication network;

making, by the client apparatus, an inquiry on an address solution based on the service ID;

transmitting, by the information processing apparatus, information on an IP address of the information processing apparatus in the communication network to the client apparatus that made the inquiry in response to the inquiry on the address solution;

providing, by the information processing apparatus, the respective service specified by the service ID to the client apparatus using the IP address;

acquiring, by the client apparatus, the service ID from the information processing apparatus, and by using the acquired service ID, acquiring the information on the IP address of the information processing apparatus to use the respective service.

14. The apparatus according to claim 1, wherein the service ID transmission unit transmits the service ID in multicast and the service connection unit receives the inquiry on the address solution in multicast.

* * * * *